Oct. 4, 1938.  M. FITOS  2,132,291
SPRING SEAT
Filed Feb. 4, 1938  3 Sheets-Sheet 1
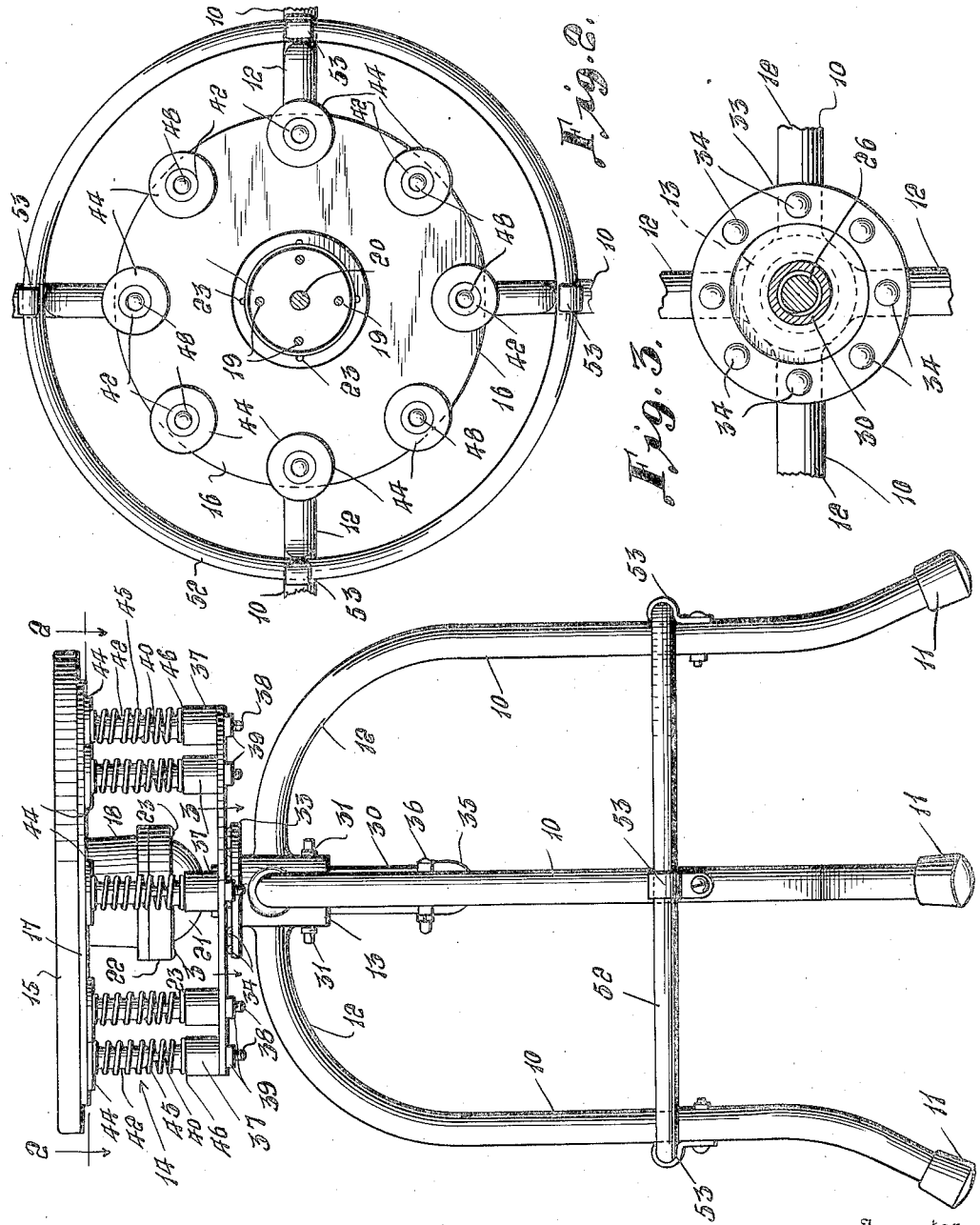
Inventor
Miklos Fitos
By Bryant & Lowry
Attorneys

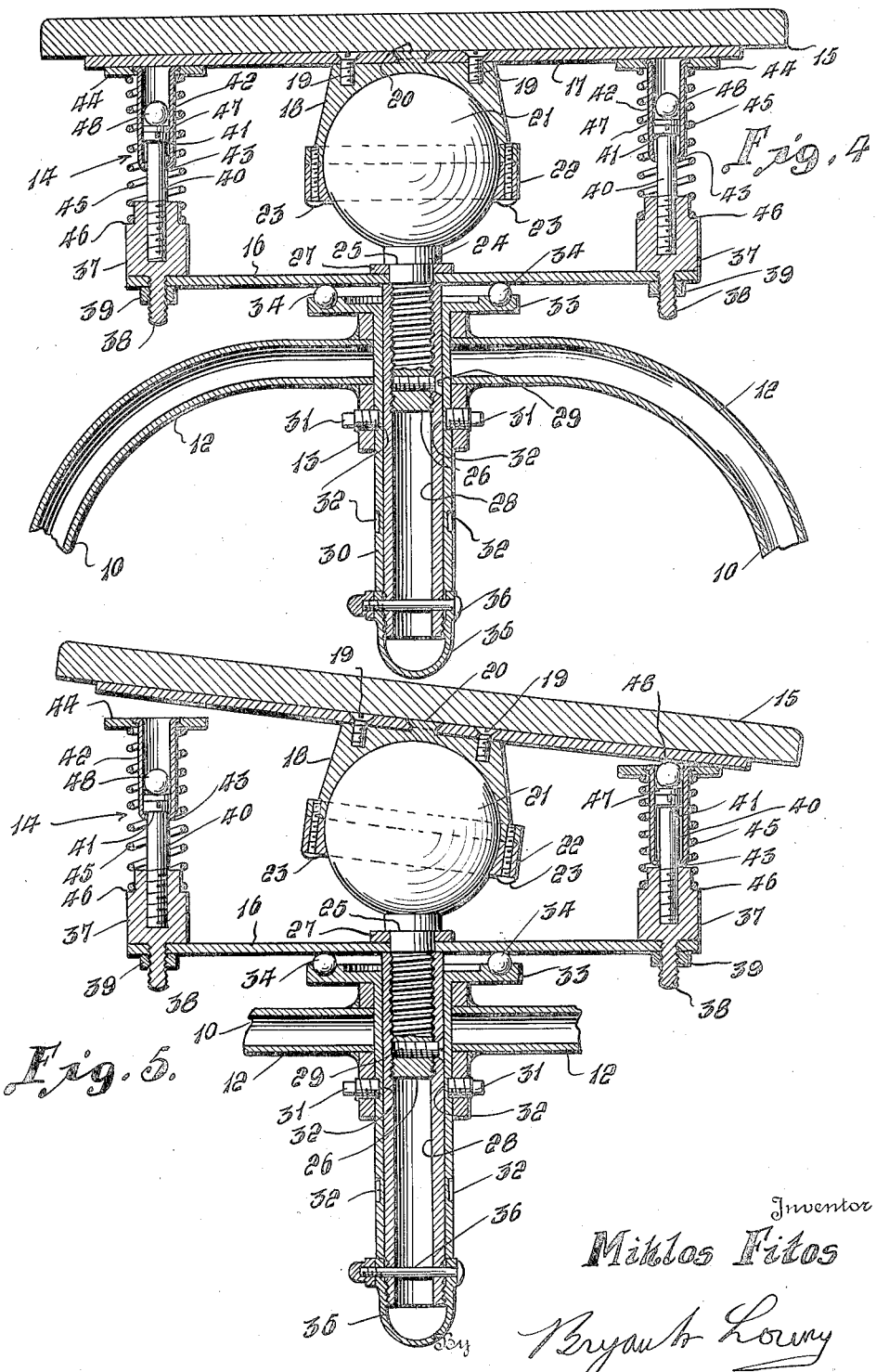

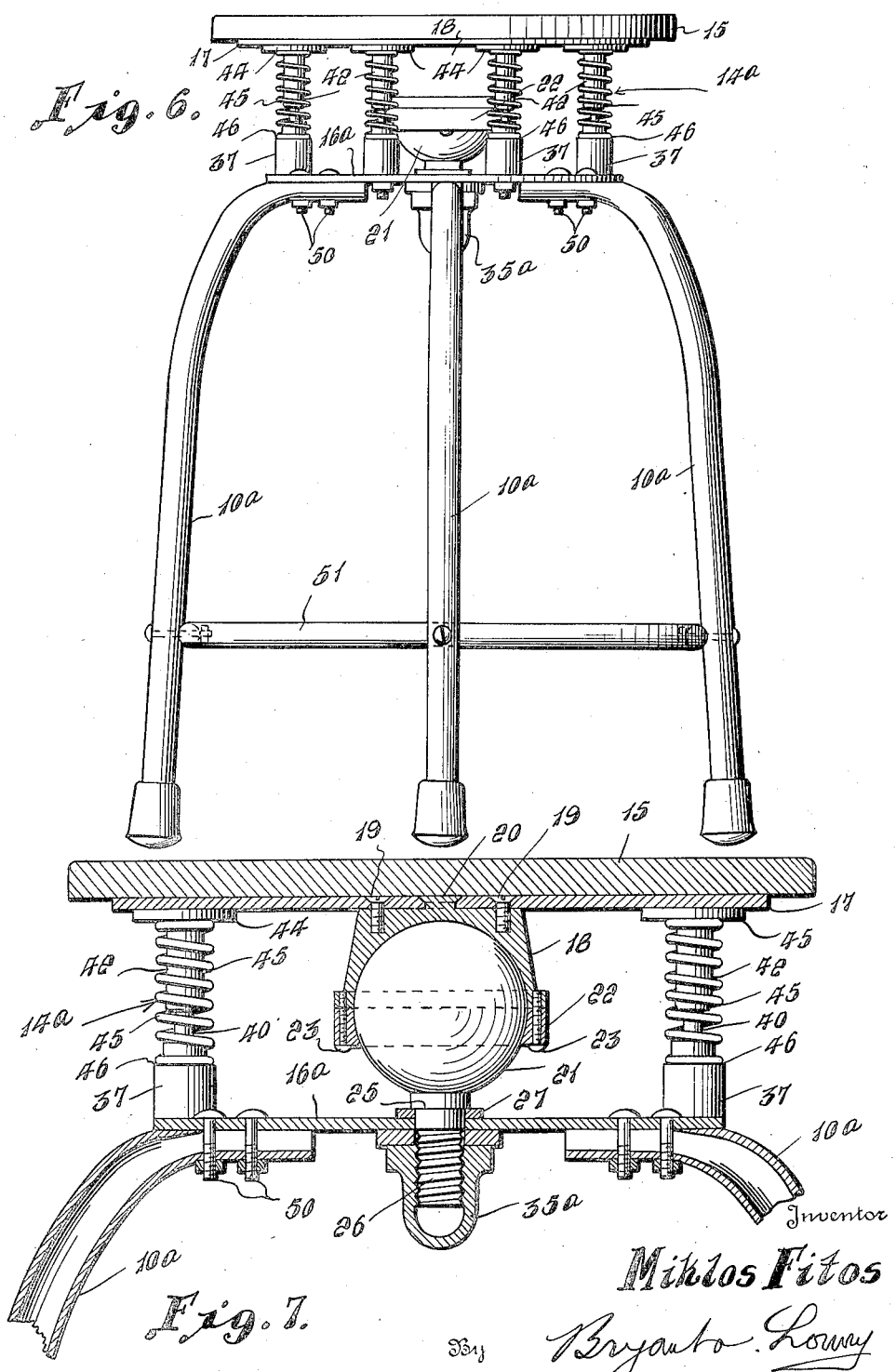

Patented Oct. 4, 1938

2,132,291

UNITED STATES PATENT OFFICE 2,132,291

SPRING SEAT

Miklos Fitos, Woodbridge, N. J.

Application February 4, 1938, Serial No. 188,745

5 Claims. (Cl. 155—52)

This invention relates to certain new and useful improvements in spring seats.

The primary object of the invention is to provide a spring seat comprising a seat bottom mounted on a seat frame with spring devices interposed between the seat bottom and frame cooperating with a centrally disposed ball and socket or universal connection between the seat bottom and frame whereby the seat bottom is free to tilt in lateral directions within the limits of the spring devices so that a person using the spring seat may lean or bend over in all directions with safety and without liability of falling therefrom.

A further object of the invention is to provide a spring chair or seat of the foregoing character and of the pedestal type embodying a centrally located universal connection between the seat bottom and seat frame with a circular series of spring devices surrounding the universal connection between the seat bottom and seat frame permitting pivotal or tilting movement of the seat bottom, one form of the invention embodying a seat bottom and sub-frame rotatably supported upon a seat frame while another form of the invention embodies a non-rotatable seat bottom resiliently mounted upon the seat frame.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of a spring seat or chair constructed in accordance with the present invention;

Figure 2 is a horizontal sectional view taken on line 2—2 of Figure 1, showing the circular series of spring devices with which the seat bottom is engaged;

Figure 3 is a detail sectional view taken on line 3—3 of Figure 1, showing the ball bearing support for the sub-frame of the seat bottom;

Figure 4 is a fragmentary vertical sectional view showing the universal or ball and socket connection between the seat bottom and sub-frame thereof and the laterally positioned spring devices between the seat bottom and sub-frame;

Figure 5 is a fragmentary sectional view, similar to Figure 4, showing the seat bottom in a tilted position within the limits of the spring devices associated therewith, the seat bottom and sub-frame illustrated in Figures 1 to 5, being of the pedestal type and rotatable upon a seat frame;

Figure 6 is a side elevational view of another form of the invention wherein the sub-frame of the seat bottom is rigidly attached to the seat frame; and Figure 7 is a fragmentary vertical sectional view of the seat bottom and sub-frame, shown in Figure 6.

Referring more in detail to the accompanying drawings, and particularly to Figures 1 to 5, there is illustrated a spring chair or seat comprising a seat frame composed of legs 10 having floor engaging feet 11 at their lower ends with the upper ends of the legs 10 curved inwardly as at 12 for anchorage as by welding or the like to a central collar 13 that is vertically disposed to form a tubular support for the seat per se and devices associated therewith.

The spring seat construction designated in general by the reference character 14 includes a seat bottom 15 which may be of any configuration desired, preferably circular in plan view and a lower disk plate 16, an axially or centrally disposed universal connection being formed between the seat bottom 15 and disk plate 16 while a marginally positioned circular series of spring devices are interposed between the seat bottom and disk plate. As shown more clearly in Figures 4 and 5, the plate 17 is suitably anchored to the underside of the seat bottom 15 and has one section of a ball socket 18 anchored thereto as at 19 by means of a circular series of screws, the socket member 18 carrying a central stud 20 that is anchored in the bottom plate 17. The ball 21 of the ball and socket joint is retained in the socket member 18 by means of the ring 22 that is detachably secured as at 23 to the lower end of the socket member 18 to extend beyond the equatorial line of the ball 21 as shown in Figures 4 and 5 so that the seat bottom 15 and socket member 18 may freely move in all directions over the ball 21.

A stem 24 is formed integral with the ball 21 and projects peripherally therefrom in a downward direction, the stem 24 being provided with a shoulder 25 and carrying a threaded shank 26, the stem 24 and threaded shank 26 projecting through the disk plate 16 with a washer 27 interposed between the shoulder 25 and disk plate. An elongated tubular member 28 is internally threaded at its upper end for the threaded reception of the shank 26 carried by the ball 21, the upper end of the tubular member 28 being engaged with the lower side of the disk plate 16 and cooperating with the washer 27 that is engaged with the shoulder 25 on the stem 24 for clamping the disk plate 16 to the ball stem 24. The tubular sleeve 28 is retained in engagement with the threaded shank 26 of the ball 21 by means of the screw 29 passing through an opening in the tubular member 28 and threading into a transverse opening in the threaded shank 26 as clearly shown in Figures 4 and 5.

A tubular bearing 30 is anchored in the collar 13 at the upper ends of the legs 10 and is vertically adjustably mounted therein by means of set screws 31 carried by the lower end of the collar 13 that have their inner ends received in vertically spaced sets of sockets 32 formed in the outer face of the tubular bearing 30. A disk flange 33 is carried by the upper end of the tubular bearing 30 and rests upon the upper end of the collar 13, ball bearings 34 carried by the upper face of the disk flange 33 providing a support for the disk plate 16 of the spring seat construction. The tubular member 28 carried by the spring seat construction and depending therefrom is lowered into the tubular bearing 30 to project below the lower end of said bearing as illustrated, a cap 35 being threaded onto the lower end of the tubular member 28 below the tubular bearing 30 and anchored to the tubular member by means of the cross pin 36. It will be understood that the spring seat construction is free to rotate in the tubular bearing 30, the disk plate 16 of the seat construction resting upon the ball bearings 34 carried by the disk flange 33 while the tubular member 28 is freely rotatable in the tubular bearing 30.

Spring devices are interposed between the seat bottom 15 and disk plate 16 and comprise a plurality of spring elements arranged in circular series at the marginal edge of the disk plate 16 around the ball and socket joint, each spring element comprising a block 37 carrying a depending screw pin 38 passing downwardly through an opening in the disk plate 16 for reception of a lock nut 39. A vertical screw 40 is threaded into the upper end of the block 37 and has a head 41 at the upper end thereof. A sleeve 42 is slidably mounted upon the upper end or shank of the screw 40, the lower end of the sleeve 42 being swaged inwardly as at 43 to provide an abutment for engagement with the head 41 of the screw while an outwardly directed flange 44 is carried by the upper end of the sleeve 42. Coil spring 45 surrounds the screw 40 and sleeve 42, the upper end of the spring being engaged with the flange 44 while the lower end of the spring is engaged with an abutment shoulder 46 on the upper end of the block 37. The tension of the spring 45 is varied by the extent to which the screw 40 is threaded into the block 37. A relatively soft washer or disk 47 of copper or like material is placed in the sleeve 42 for engagement with the head 41 of the screw and to provide a seat for the bearing ball 48 freely mounted in the sleeve 42.

The normal position of the seat bottom 15 is shown in Figures 1 and 4 and when the threaded shank 26 of the ball 21 is engaged with the tubular member 28, the seat bottom 15 and disk plate 16 are moved toward each other for normally placing the springs 45 under tension with flanges 44 at the upper ends of the sleeves 42 engaged with the bottom plate 17 carried by the underside of the seat bottom 15. With the seat bottom 15 horizontally positioned as illustrated, the balls 48 in the sleeves 42 are spaced from the bottom plate 17 and the spring seat per se 14 is free to rotate by means of its tubular member 28 journalled in the tubular bearing 30. The seat bottom 15 is free to tilt within the limits of the springs 45 and as shown in Figure 5, the seat bottom when tilted teeters on its ball and socket joint, one or more of the sleeves 42 being lowered against the tension of associated springs 45 and at which time the balls 48 in said sleeves are positioned for engagement with the bottom plate 17 which will permit slight rotative movement of the seat bottom 15 relative to the disk plate 16. The ball and socket joint 18—21 guides the seat bottom 15 in its tilting movement and maintains the seat bottom in a correct position relative to the seat frame comprising the leg structures. A person using a spring seat or chair of the character disclosed herein is permitted free unobstructed body movement in all directions. As shown in Figure 1, a brace ring 52 for the legs 10 is secured to the outer sides of said legs by means of clips 53.

In the spring seat construction shown in Figures 6 and 7, the spring seat construction per se is identical with the disclosure in Figures 1 to 5 except that the seat construction is non-rotative, the disk plate 16a being fixedly secured as at 50 to the upper ends of the legs 10a. As shown in Figure 6, a brace ring 51 for the legs 10a is secured to the inner sides of said legs. The threaded shank 26 carried by the ball 21 passes through the disk plate 16a and is anchored thereto by means of the cap nut 35a.

While there are herein shown and described the preferred embodiments of the invention, it is nevertheless to be understood that minor changes may be made therein without departing from the spirit and scope of the invention as claimed.

I claim:—

1. In a chair or seat construction of the character described, a base frame including supporting legs, a spring seat construction at the upper ends of the legs including a seat bottom and a disk plate below the seat bottom supported on the base frame, a centrally positioned ball and socket connection between seat bottom and disk plate for universal tilting movements of the seat bottom relative to the disk plate, and a circular series of spring devices interposed between the seat bottom and disk plate and surrounding the ball and socket connection said spring devices being secured at their lower ends to the disk plate with flanged heads at their upper ends freely engaged with the seat bottom and anti-friction means associated with the spring devices and adapted to be engaged with the seat bottom when the spring devices are compressed during tilting movements of the seat bottom.

2. In a chair or seat construction of the character described, a base frame including supporting legs, a spring seat construction at the upper ends of the legs including a seat bottom and a disk plate below the seat bottom supported on the base frame, a centrally positioned ball and socket connection between seat bottom and disk plate for universal tilting movements of the seat bottom relative to the disk plate, a circular series of spring devices interposed between the seat bottom and disk plate and surrounding the ball and socket connection, said spring devices being secured at their lower ends to the disk plate with flanged heads at their upper ends freely engaged with the seat bottom and anti-friction means associated with the spring devices and adapted to be engaged with the seat bottom when the spring devices are compressed during tilting movements of the seat bottom and said spring seat construction being rotatably mounted on the upper end of the base frame.

3. In a chair or seat construction of the character described, a base frame including supporting legs, a spring seat construction at the upper ends of the legs including a seat bottom and a disk plate below the seat bottom supported on the base frame, a centrally positioned ball and socket connection between seat bottom and disk plate for universal tilting movements of the seat bottom relative to the disk plate, a circular series of spring devices interposed between the seat bottom and disk plate and surrounding the ball and socket connection, said spring devices being secured at their lower ends to the disk plate with flanged heads at their upper ends freely engaged with the seat bottom and anti-friction means associated with the spring devices and adapted to be engaged with the seat bottom when the spring devices are compressed during tilting movements of the seat bottom and said spring seat construction being rigidly mounted on the upper end of the base frame.

4. In a chair or seat construction of the character described, a base frame including supporting legs, a spring seat construction at the upper ends of the legs including a seat bottom and a disk plate below the seat bottom supported on the base frame, a centrally positioned ball and socket connection between seat bottom and disk plate for universal tilting movements of the seat bottom relative to the disk plate, a circular series of spring devices interposed between the seat bottom and disk plate and surrounding the ball and socket connection, each spring device including a variably tensioned sleeve carried by the disk plate and a flange at the upper end of the sleeve normally engaged with the under side of the seat bottom and a bearing ball in the sleeve normally spaced from the upper end thereof and adapted for engagement with the under side of the seat bottom when the sleeve is lowered during tilting movements of the seat bottom.

5. In a chair or seat construction of the character described, a base frame including supporting legs, a spring seat construction at the upper ends of the legs including a seat bottom and a disk plate below the seat bottom supported on the base frame, a centrally positioned ball and socket connection between seat bottom and disk plate for universal tilting movements of the seat bottom relative to the disk plate, and a circular series of spring devices interposed between the seat bottom and disk plate and surrounding the ball and socket connection, each spring device including a block anchored to the marginal edge of the disk plate, a headed screw rising from the block, a sleeve having an annular flange at its upper end slidable on the block and an abutment on its lower end engaged with the head of the screw, a coil spring surrounding the sleeve and screw and engaged with the block and sleeve flange and a bearing ball in the sleeve normally spaced from the upper end thereof and adapted for engagement with the underside of the seat bottom when the sleeve is lowered during tilting movements of the seat bottom.

MIKLOS FITOS.